United States Patent [19]
Wakabayashi

[11] Patent Number: 5,682,570
[45] Date of Patent: Oct. 28, 1997

[54] FILM CARTRIDGE LOADING MECHANISM

[75] Inventor: Tsutomu Wakabayashi, Yokohama, Japan

[73] Assignee: Nikon Corporation, Tokyo, Japan

[21] Appl. No.: 626,003

[22] Filed: Apr. 1, 1996

[30] Foreign Application Priority Data

Apr. 6, 1995 [JP] Japan ................................. 7-081435

[51] Int. Cl.⁶ ........................ G03B 7/00; G03B 17/02
[52] U.S. Cl. ........................ 396/536; 396/538; 396/543
[58] Field of Search ............................ 354/21, 174, 275, 354/288; 396/439, 511, 512, 535, 536, 538, 543

[56] References Cited

U.S. PATENT DOCUMENTS

| | | | |
|---|---|---|---|
| 4,240,734 | 12/1980 | Nomura et al. | 354/288 |
| 4,363,547 | 12/1982 | Hashimoto et al. | 354/275 |
| 5,159,365 | 10/1992 | Takahashi et al. | 354/21 |
| 5,323,201 | 6/1994 | Richiuso et al. | 354/288 |
| 5,430,515 | 7/1995 | Lawther et al. | 354/174 |
| 5,477,295 | 12/1995 | Lawther et al. | 354/174 |

FOREIGN PATENT DOCUMENTS 4-30136  2/1992  Japan .

*Primary Examiner*—Eddie C. Lee
*Attorney, Agent, or Firm*—Oliff & Berridge

[57] ABSTRACT

A film cartridge loading mechanism includes a cartridge chamber into which a film cartridge is loaded, an eject member capable of traveling between a housing position at which the loaded film cartridge is held inside the cartridge chamber, and a take-out position at which a portion of the film cartridge projects out of the cartridge chamber, that travels to the housing position as the film cartridge is loaded and travels to the take-out position by an eject operation, a pressure applying member which presses the film cartridge which has been completely loaded in the cartridge chamber, in the direction of the longitudinal axis, to regulate a movement of the film cartridge, and a toggling force applying mechanism that applies a force to the eject member. The toggling force applying mechanism changes a direction of force application thereto while the eject member moves, in such a manner that the eject member at the housing position is held at said housing position and the eject member at the take-out position is held at the take-out position.

12 Claims, 8 Drawing Sheets

FILM CARTRIDGE LOADING MECHANISM

BACKGROUND OF THE INVENTION

1. Field of the Invention

The present invention relates to a film cartridge loading mechanism having a cartridge chamber into which a film cartridge is loaded.

2. Description of the Related Art

There are cameras in the known art that adopt the so-called drop-in method whereby a film cartridge is loaded into a cartridge chamber in the direction of the major axis (the longitudinal axis) via a cartridge insertion opening which is provided on the upper surface or the bottom surface of the camera main body (for instance, Japanese Laid-Open Publication Serial No. Heisei 4-30136). In this type of camera, in order to prevent the cartridge from moving in the direction of the major axis after insertion of the cartridge has been completed, it is desirable to provide a pressure applying member which holds the cartridge by applying pressure in the direction of the major axis. This type of pressure applying member is provided at, for instance, the rear surface of the open/close lid for opening and closing the cartridge insertion opening.

It is required, for control, to provide a load detection switch for detecting whether or not a cartridge is present in the cartridge chamber and the load-detection switch for this purpose is often the type wherein the loaded cartridge presses on one contact piece so that it will come in contact with another contact piece. However, with a load detection switch structured as described above, since the recovery force of the contact piece that has been deformed by the cartridge works against the pressing force of the pressure applying member, the holding of the cartridge by the pressure holding member is adversely affected.

SUMMARY OF THE INVENTION

An object of the present invention is to provide a film cartridge loading mechanism which ensures that the force working against the pressing force of the pressure applying member holding the cartridge by pressure is not applied to the cartridge.

In order to achieve the object described above, the film cartridge loading mechanism according to the present invention comprises a cartridge chamber into which a film cartridge is loaded, an eject member capable of traveling between a housing position at which the loaded film cartridge is held inside the cartridge chamber, and a take-out position at which a portion of the film cartridge projects out of the cartridge chamber, that travels to the housing position as the film cartridge is loaded and travels to the take-out position by an eject operation, a pressure applying member which presses the film cartridge in the cartridge chamber in a direction of a longitudinal axis of the film cartridge to regulate a movement of the film cartridge, and a toggling force applying mechanism that applies a force to the eject member. The toggling force applying mechanism changes a direction of force application thereto while the eject member moves, in such a manner that the eject member at the housing position is held at the housing position and the eject member at the take-out position is held at the take-out position.

According to the present invention, by using the toggling force applying mechanism it is ensured that when the eject member is at the housing position, a force is applied to the eject member in the direction in which it is held at the housing position and that when the eject member is at the take-out position, a force is applied to the eject member in the direction in which it is held at the take-out position. Consequently, the pressure applying member can hold the film cartridge in the cartridge chamber without difficulty since no force is applied to the film cartridge by the toggling force applying mechanism. In addition, the operating force required when moving the eject member to the take-out position and the pressing force required when loading a film cartridge are reduced.

Furthermore, with the use of the toggling force applying mechanism, the structure can be simplified. In other words, if a spring that applies force to the eject member only in the direction in which the cartridge is taken out were used, then a locking member for stopping the eject member when it has moved to the housing position and a lock releasing member for releasing the lock by the locking member would be required. However, the present invention does not require any of these members and, therefore, a reduction in the number of parts and a reduction in production costs are achieved.

Another aspect of the present invention comprises the cartridge chamber, the pressure applying member described above, a load detection switch provided with a contact piece that becomes deformed by being pressed in a same direction as the direction in which the cartridge is pressed by the pressure applying member and recovers to an original shape by being released the pressure, which outputs a cartridge present signal with the contact piece being deformed and outputting cartridge absent signal with the contact piece being recovered to the original shape, a switch operating member that holds a position away from the contact piece when the film cartridge is absent from the cartridge chamber and travels to a pressure applying position at which the contact piece is pressed to become deformed with the film cartridge being loaded into the cartridge chamber, and a retaining mechanism which retains the switch operating member at the pressure applying position when the film cartridge is in the cartridge chamber.

According to the present invention, since a cartridge-present signal is output by deforming the contact piece of the load detection switch by the switch operating member traveled to the pressure applying position when a film cartridge is loaded and the retaining mechanism ensures that the switch operating member is always held at the pressure applying position while the film cartridge is in the cartridge chamber, the recovery force of the contact piece of the load detection switch does not work on the film cartridge. Therefore, the holding of the film cartridge by the pressure applying member is not adversely affected in any way whatsoever.

If a portion of the eject member which makes it possible to take out the film cartridge is used as the switch operating member, the number of parts can be reduced and production costs can also be reduced. In particular, if the switch operating member can be constituted with the cartridge press-out portion of the eject member, it will not be necessary to provide a separate switch operating portion at the eject member, which will be further advantageous from the viewpoint of saving installation space and cost. If the retaining mechanism is constituted with a toggle spring, the operating force required when moving the eject member to the take-out position and the pressing force required when loading a film cartridge can be reduced.

DETAILED DESCRIPTION OF THE PREFERRED EMBODIMENT

In reference to FIGS. 1-8, one embodiment of the present invention when applied to a film cartridge loading mechanism of a camera, is explained.

Figure 1:
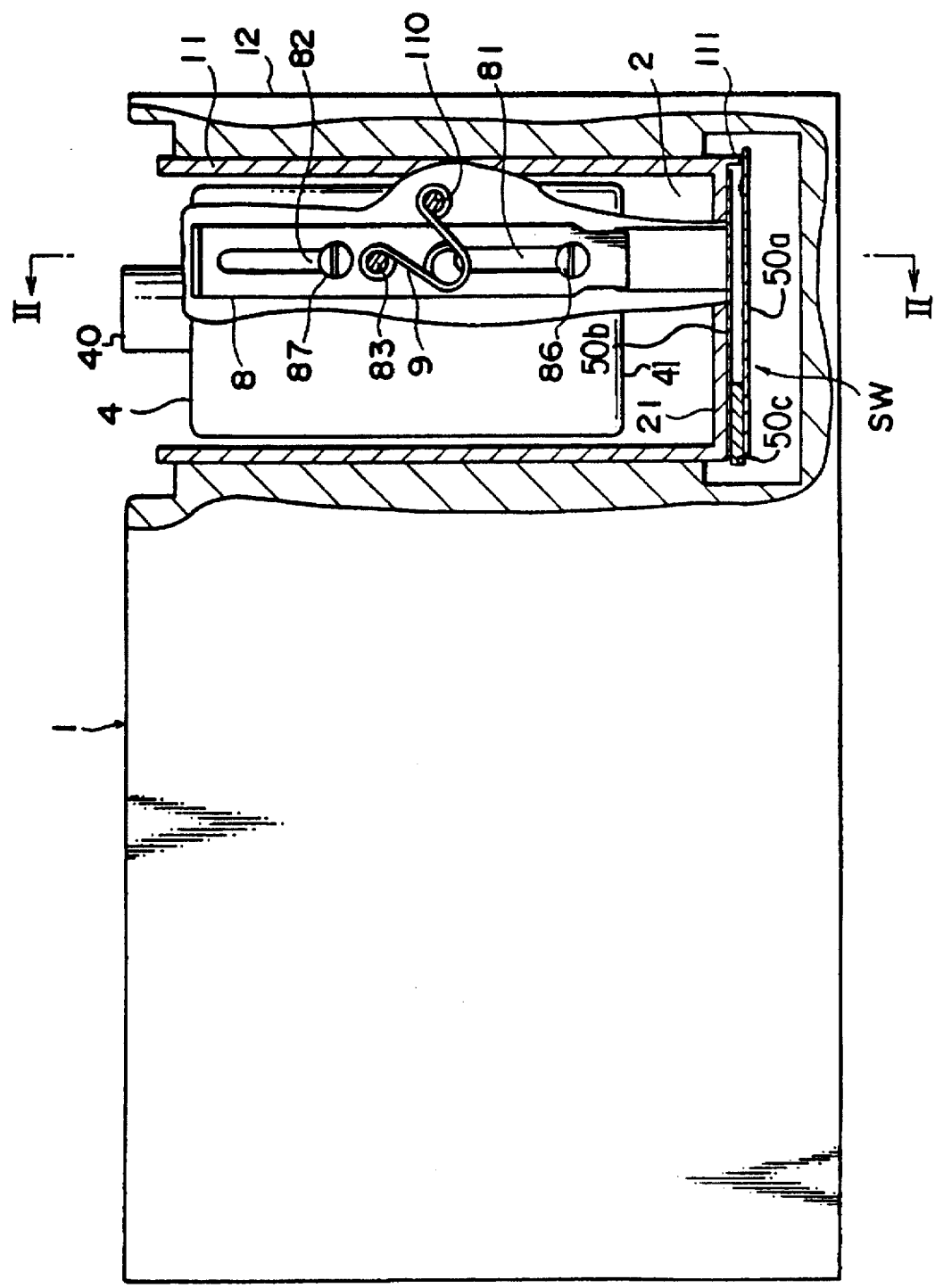
FIG. 1 is a partial cross section of the structure of an essential portion of a camera in one embodiment according to the present invention, in a state in which no film cartridge is loaded.
Figure 2:
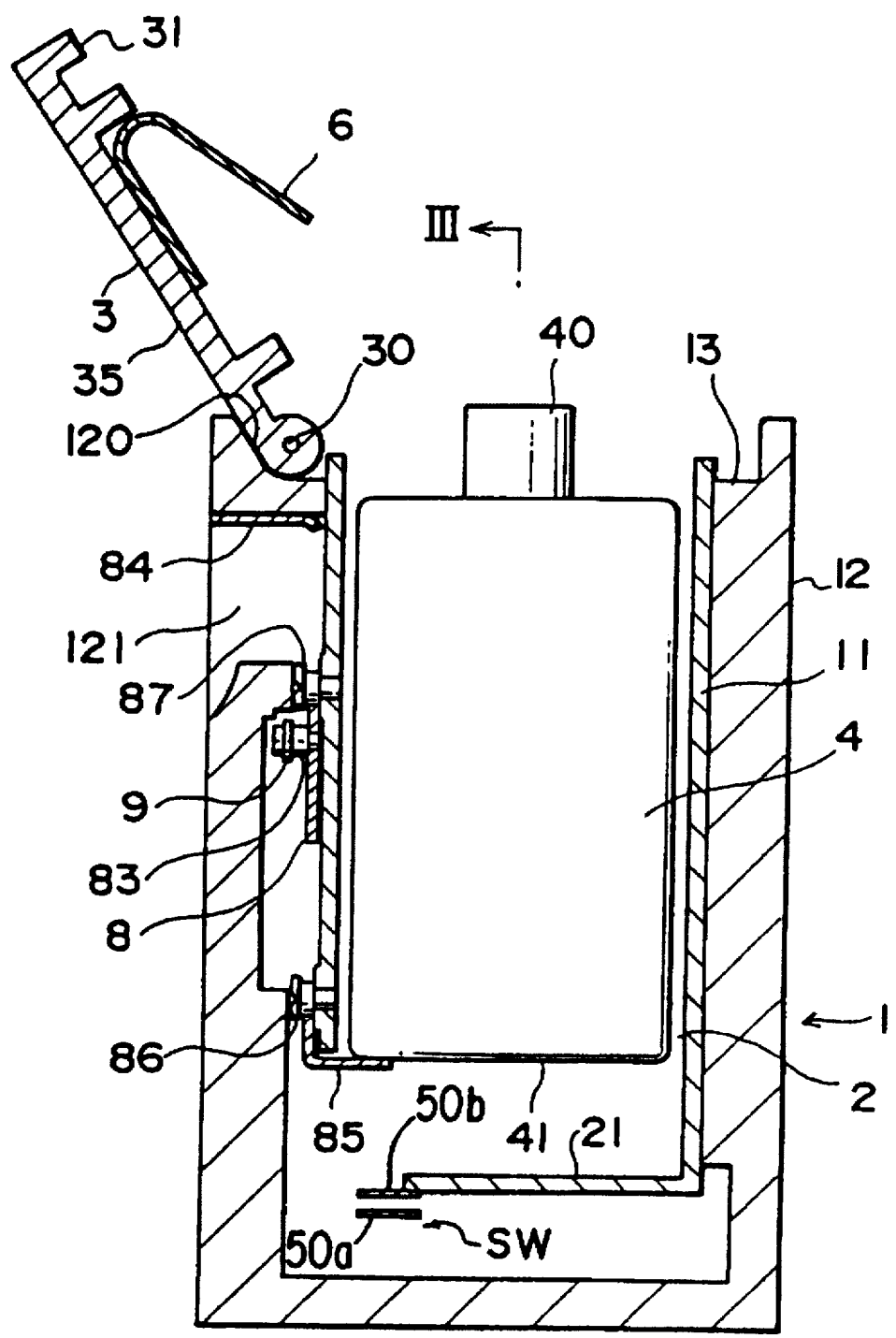
FIG. 2 is a cross section through line II—II in FIG. 1.
Figure 3:
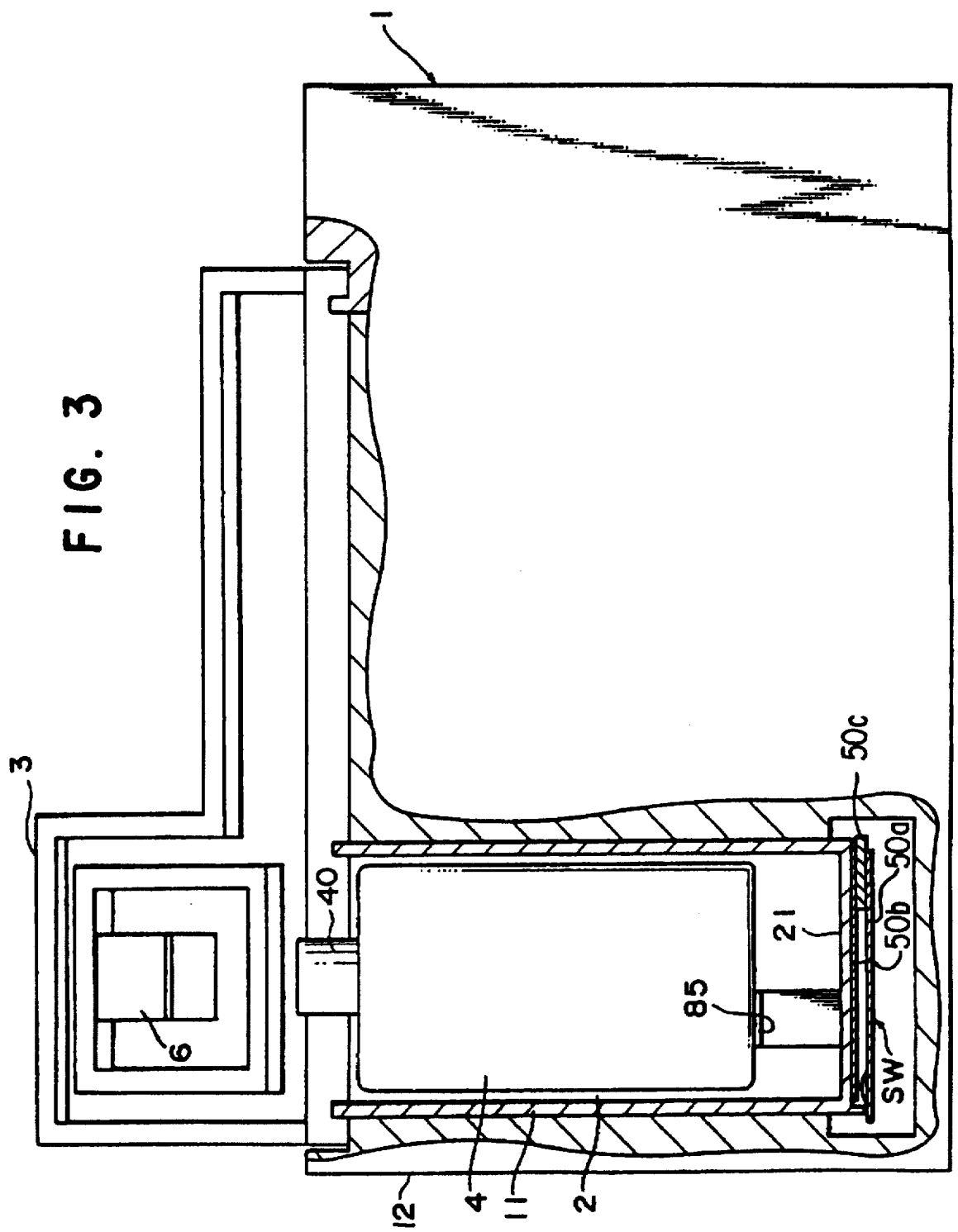
FIG. 3 is a cross section through line III—III in FIG. 2.
Figure 4:
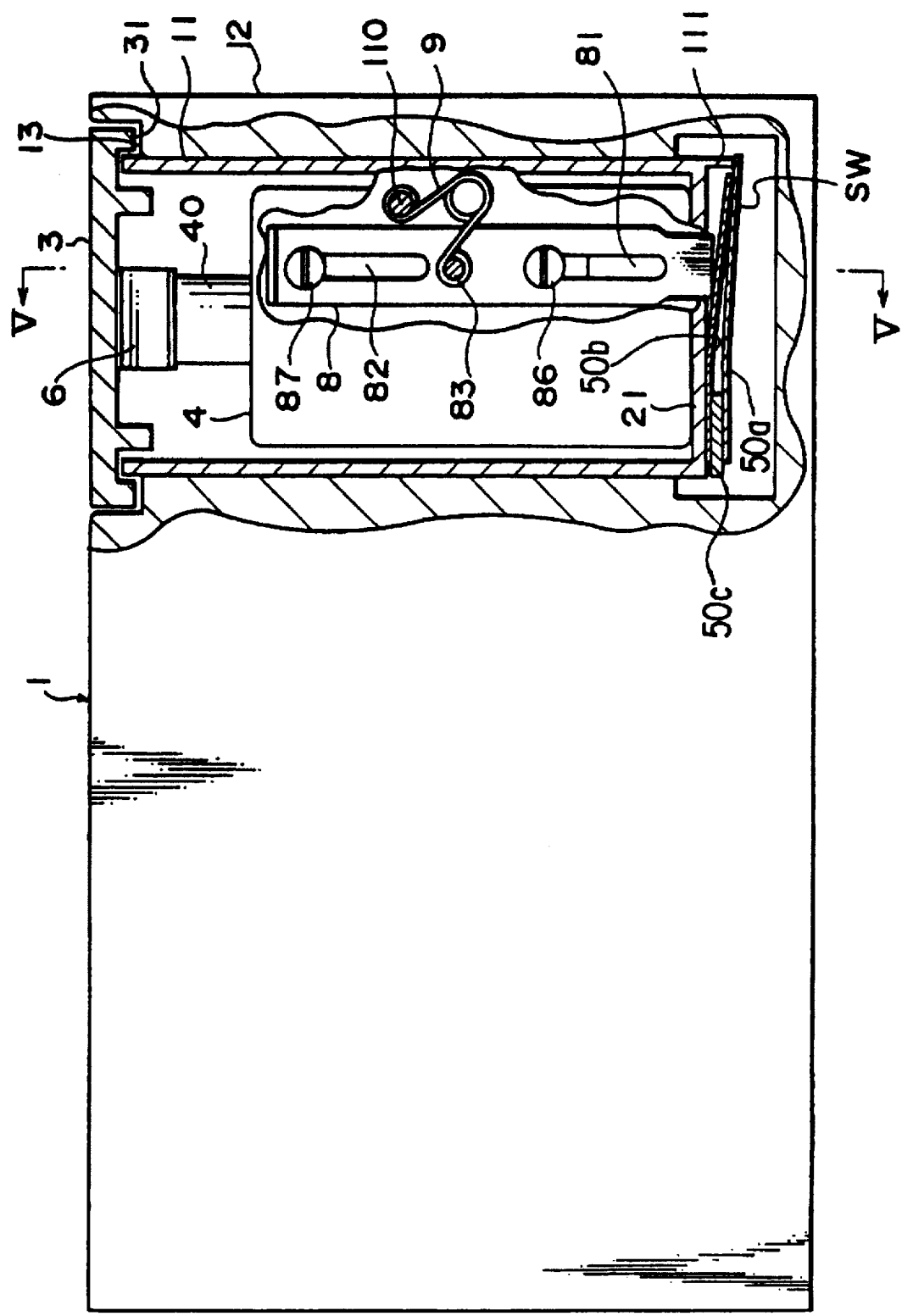
FIG. 4 is similar to FIG. 1 but shows a state in which a film cartridge is loaded.
Figure 5:
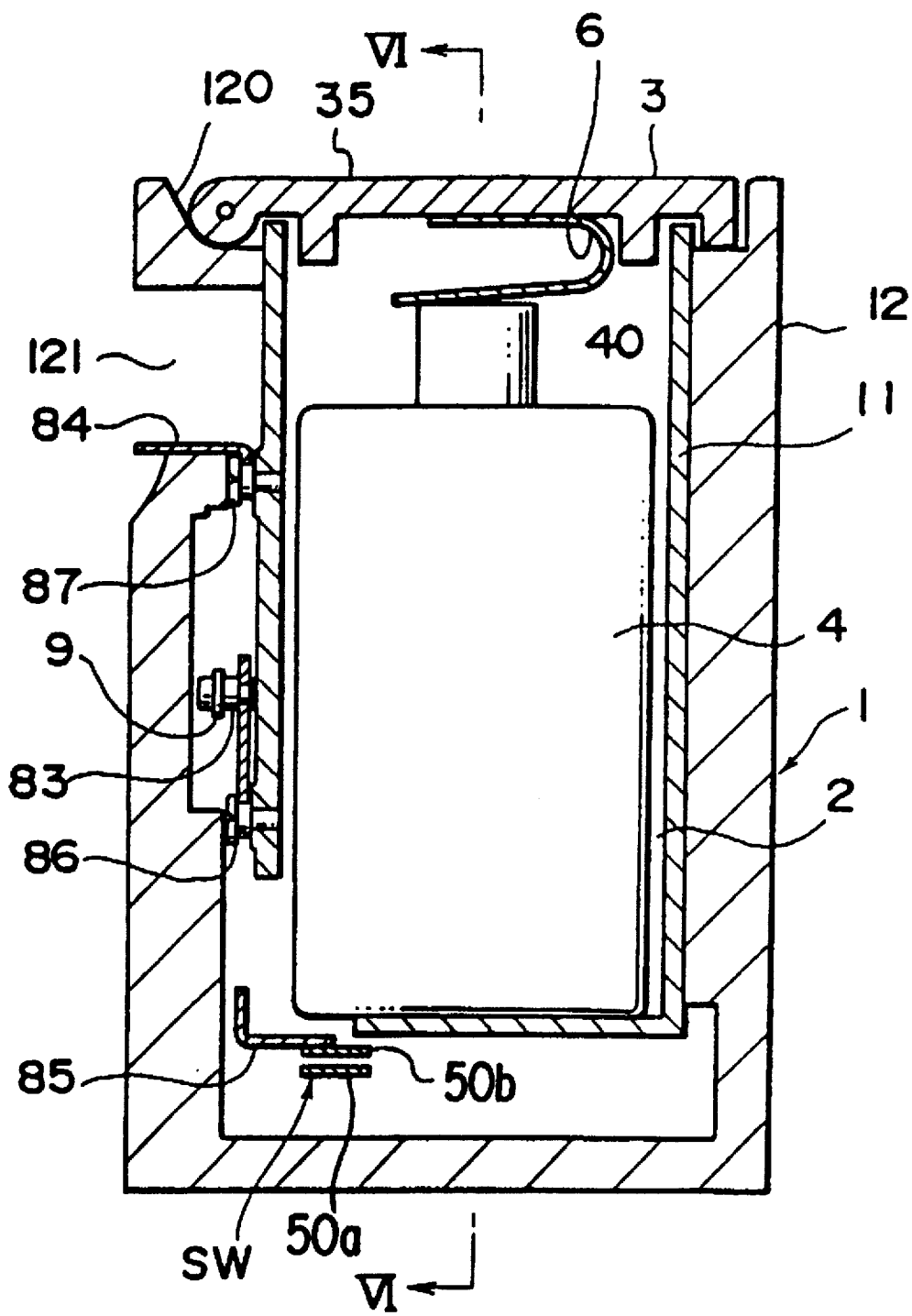
FIG. 5 is a cross section through line V—V in FIG. 4.
Figure 6:
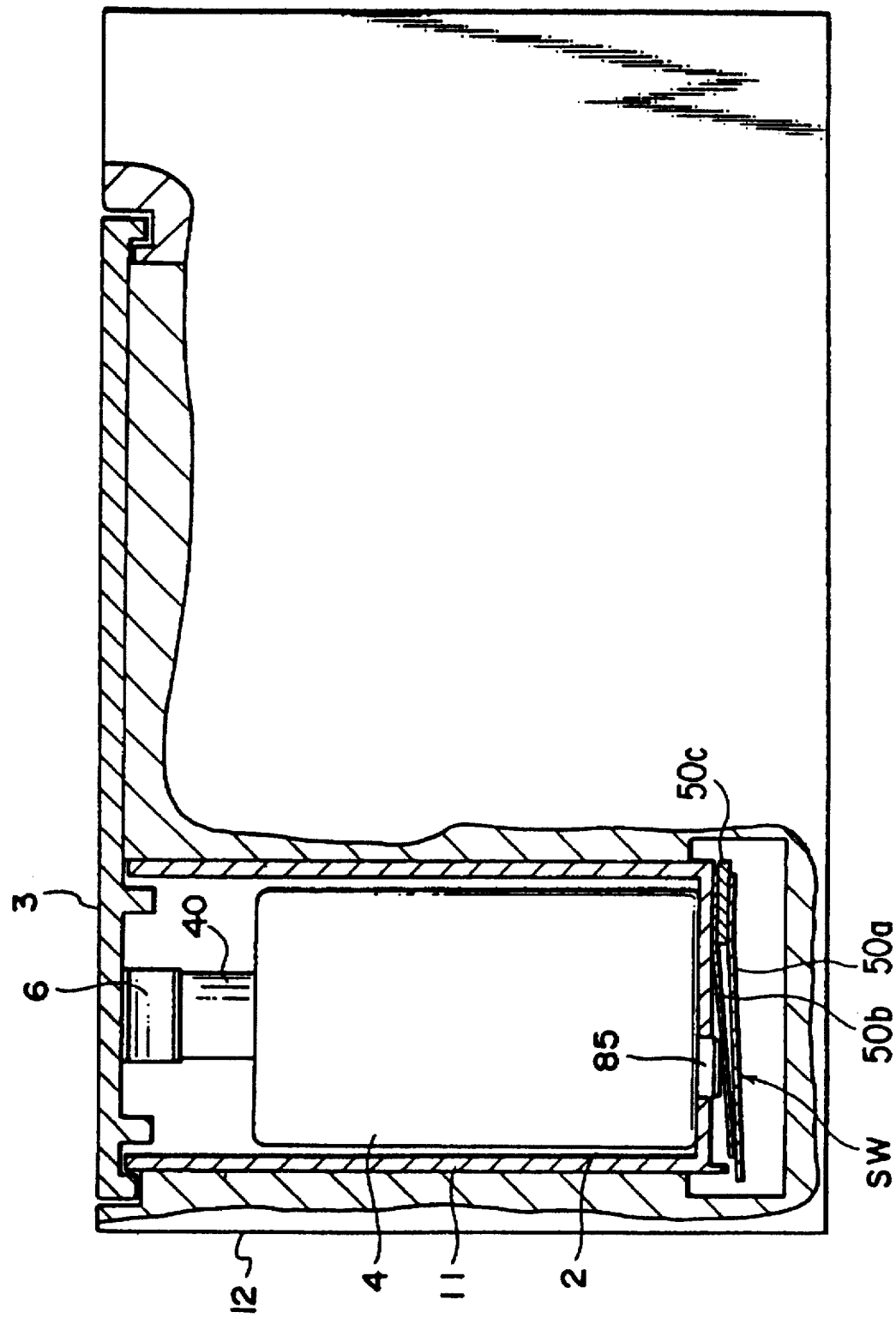
FIG. 6 is a cross section through line VI—VI in FIG. 5.

FIGS. 1-6 show cross sections of an essential portion of a camera in one embodiment according to the present invention, with FIGS. 1-3 showing a state in which no cartridge is loaded and FIGS. 4-6 showing a state in which a cartridge is loaded.

Reference number 1 indicates a camera main body which comprises a body 11 constituted with plastic, aluminum die cast or the like and a cover 12 which covers its exterior. At one end of the camera main body 1, a cartridge chamber 2 is provided, with an insertion opening on the upper surface of the main body 1. A film cartridge 4 is loaded into this cartridge chamber 2. Inside the cartridge 4, a spool shaft 40, around which film is wound, is provided at the central portion with one end projecting out from the cartridge 4.

Although not shown, a housing space for housing the film is provided, communicating with the cartridge chamber. When loading a cartridge, the front end portion of the film pulled out from the cartridge 4 is housed in the film housing space. At this point, the perforations in the film are engaged with a sprocket (not shown) and, with the rotation of the sprocket, the film is fed toward the take-up spool to be wound up onto it.

On the upper surface of the camera main body 1, an open/close lid 3 for opening and closing the cartridge chamber 2 and the film housing space is mounted in such a manner that it can rotate around a hinge shaft 30. This open/close lid 3 can rotate between the open position shown in FIGS. 1-3 and the closed position shown in FIGS. 4-6. At the open position, the external surface 35 of the open/close lid 3 comes in contact with a stopping surface 120 of the cover 12 of the camera main body 1, to restrict the rotation of the open/close lid 3. At the closed position, a contact portion 31 of the open/close lid 3 comes in contact with a contact portion 13 of the camera main body 1. On the rear surface of the open/close lid 3, a spring 6 is provided for holding the cartridge 4 inside the cartridge chamber by applying force to it in the direction of the major axis.

In the space between the body 11 and the cover 12, which form the cartridge chamber 2, an eject lever 8 for pushing the cartridge 4 out from the cartridge chamber 2 is provided in such a matter that it can travel in the vertical direction relative to the camera. A pair of staged machine screws 86 and 87 which are secured to the body 11 by screwing, are connected in a pair of guide holes 81 and 82 respectively, formed in the eject lever 8. With this, the upward and downward movement of the eject lever 8 is guided and, at the same time, the upper limit position and the lower limit position of the eject lever 8 are set.

The two ends of a torsion coil spring 9 are hooked and held at a pin 83 mounted in the eject lever 8 and a hub 110 formed in the body 11 and a toggling force is applied to the eject lever 8 by the torsion coil spring 9. In other words, in the state shown in FIG. 1, the torsion coil spring 9 applies a force to the eject lever 8 in the upper-left direction in the figure. During a process in which the eject lever 8 shifts from the state shown in FIG. 1 to the state shown in FIG. 4, the direction of the applied force changes to the lower-left direction in the figure and, in the state shown in FIG. 4, the force applied in this lower-left direction is held. Also, when the eject lever 8 shifts from the state shown in FIG. 4 to the state shown in FIG. 1, the direction of the force applied changes in the reverse manner from that described above.

The upper end portion of the eject lever 8 in the figure is bent toward the outside so that it projects out to the outside of the camera main body 1 through a window 121 formed in the cover 12, as shown in FIG. 2 and with this, an operating portion 84 for manually operating the eject lever 8 is formed. The lower end of the eject lever 8 in the figure is bent toward the inside almost horizontally and, with this, a push-out portion 85 for pushing the cartridge 4 in the cartridge chamber 2 in the upward direction in the figure, is formed. This push-out portion 85 is projected out into the cartridge chamber 2 through a slot formed on a side surface of the cartridge chamber 2.

In the space between a bottom plate 21 of the cartridge chamber 2 formed by the body 11 of the camera main body 1 and the bottom surface of the cover 12, a cartridge load detection switch SW is provided. This load detection switch SW is constituted with a pair of flexible contact pieces 50a and 50b provided across an insulator 50c and is located almost directly under the push-out portion 85 of the eject lever 8. The contact piece 50a is provided with a spherical projecting portion to ensure that the contact with the contact piece 50b is made reliably. When the eject lever 8 is at an elevated position, as shown in FIG. 2, a portion of the upper contact piece 50b is in contact with the lower surface of the bottom plate 21. In order to prevent unexpected contact of the contact pieces 50a and 50b, the movement of the contact piece 50a in the upward direction in the figure is restricted by a projecting portion 111, (see FIG. 1) of the body 11.

When the eject lever 8 is lowered, as shown in FIGS. 4-6, the contact piece 50b is pressed in the downward direction in the figure by the push-out portion 85, and the deformed contact piece 50b comes in contact with the contact piece 50a. At this time, the contact piece 50a departs from the projecting portion 111.

Note that, when the body 11 is formed with an insulating material such as plastic, the contact piece 50b may be directly fixed to the body 11, as shown in the figure. However, when the body 11 is formed with a conducting material such as aluminum die cast, it is desirable to provide an insulator between the contact piece 50b and the body 11.

Figure 7:
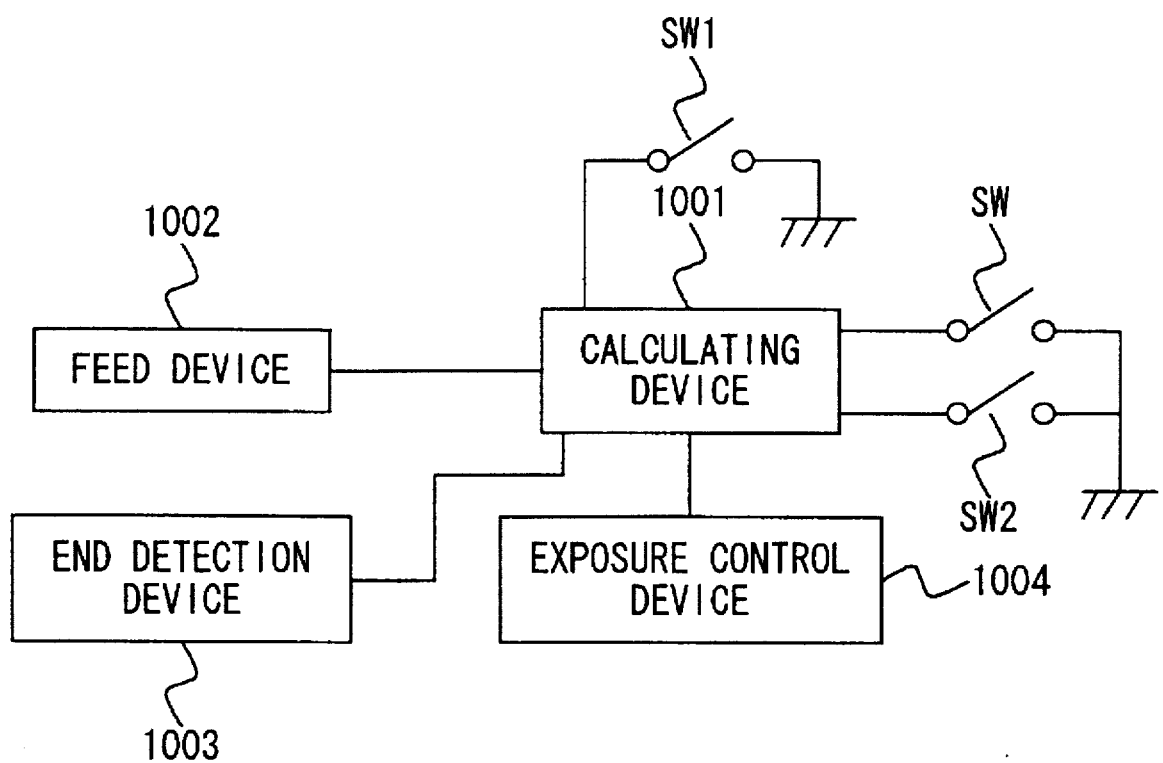
FIG. 7 is a block diagram showing the structure of the control system of a camera.

FIG. 7 shows the structure of the control system of the camera.

A film feed device 1002 which performs film wind-up and rewind with a film feed motor, a film end-detection device 1003, which detects that the film has reached its trailing end from the tension force of the film and an exposure control device 1004, which performs photographing by driving the aperture and shutter (not shown) are connected to a calculating device 1001.

Moreover, the load detection switch SW mentioned earlier, a release switch SW1 which is turned on with the pressing down of a release button (not shown) and is turned off with the release of the release switch and an open/close switch SW2 which is turned on when the open/close lid 3 is opened and is turned off when it is closed, are connected to the calculating device 1001.

The following is an explanation of the operation of the camera described above.

(1) Cartridge Loading Operation

As shown in FIG. 3, the open/close lid 3 is opened to insert the cartridge 4 in the cartridge chamber 2. At this time, it should be ensured that the film pulled out from the cartridge 4 is housed in the film housing space. When the cartridge 4 is inserted to the position shown in FIGS. 1–3, the lower end surface 41 of the cartridge 4, comes in contact with the push-out portion 85 of the eject lever 8. When the upper end surface of the cartridge 4 is pressed down by hand, the cartridge 4 is inserted further in and, with this, the eject lever 8 travels downward together with the cartridge 4. Since a force is applied to the eject lever 8 by the torsion coil spring 9 in the upward direction initially, the eject lever 8 travels downward against the force applied by the torsion coil spring 9.

Before the eject lever 8 and the cartridge 4 reach the position shown in FIGS. 4–6, the direction of the force applied by the torsion coil spring 9 changes, so that a downward force is applied to the eject lever 8. Thus, the eject lever 8 travels to the position shown in FIGS. 4–6 on its own before the cartridge 4 is completely loaded and the push-out portion 85 of the lever 8 distorts the contact piece 50b of the load detection switch SW by pressure to cause it to come in contact with the contact piece 50a. In other words, the load detection switch SW is turned on. Since the force applied by the torsion coil spring 9 is sufficiently larger than the recovery force of the contact piece 50b, the load detection switch SW is not turned off by the recovery force of the contact piece 50b.

After this, the lower end surface 41 of the cartridge 4 comes in contact with the bottom plate 21 of the cartridge chamber 2. When the open/close lid 3 is closed, the spring 6 of the open/close lid 3 presses on one end of the spool shaft 40 to hold the cartridge 4 to the bottom plate 21 by pressure. Subsequently, until the cartridge 4 is taken out, the load detection switch SW holds the on state and during this period of time, the lower end surface 41 of the cartridge 4 is not in contact with the push-out portion 85 or the contact piece 50b. Consequently, the upward recovery force of the contact piece 50b does not work on the cartridge 4 as a force working against the pressing force of the spring 6. In addition, the force applied by the torsion coil spring 9 does not work on the cartridge 4, either. As a result, the holding of the cartridge 4 by the spring 6 is not affected at all.

When a specific operation is performed after this, the sprocket which is engaged with the perforations in the film and the take-up spool (neither shown) rotate so that the film is fed and taken up on the take-up spool.

(2) Cartridge Take Out Operation

In order to take the cartridge 4 out of the chamber 2 after photographing, the open/close lid 3 is first opened and then the operating portion 84 of the eject lever 8 is moved in the upward direction with a finger against the force applied by the torsion coil spring 9 (eject operation is performed). With this, the push-out portion 85 of the eject lever 8 moves the cartridge 4 upward and also the push-out portion 85 departs from the contact piece 50b of the load detection switch SW. Thus, the contact piece 50b recovers its original state, departing from the contact piece 50a, and the switch SW is turned off.

The direction of the force applied by the torsion coil spring 9 changes while the eject lever 8 is traveling upward so that the force is applied to the eject lever 8 in the upward direction. With this force application, the eject lever 8 automatically travels upward to the position shown in FIG. 1 even if the finger is removed from the operating portion 84, and the upper portion of the cartridge 4 projects out from the cartridge chamber 2. As a result, it is not necessary to press the operating portion 84 upward all the way, achieving an improvement in operability. At the moment when the force applied by the torsion coil spring 9 changes its direction, the eject lever 8 momentarily enters a state in which no force is applied to it in any direction whatsoever. However, even if the finger releases the operating portion 84 at this time, because of the friction between the guide holes 81 and 82 and the staged machine screws 86 and 87, the eject lever 8 and the cartridge 4 do not travel downward by gravity.

Note that whereas in the example shown in the figures, the direction of the force imparted by the torsion coil spring 9 to the eject lever 8 acts toward the upper left, the eject lever 8 does not travel downward in this case either because of the friction between the eject lever 8 and the staged machine screws 86 and 87.

(3) Example of the Use of the Load Detection Switch

Figure 8:
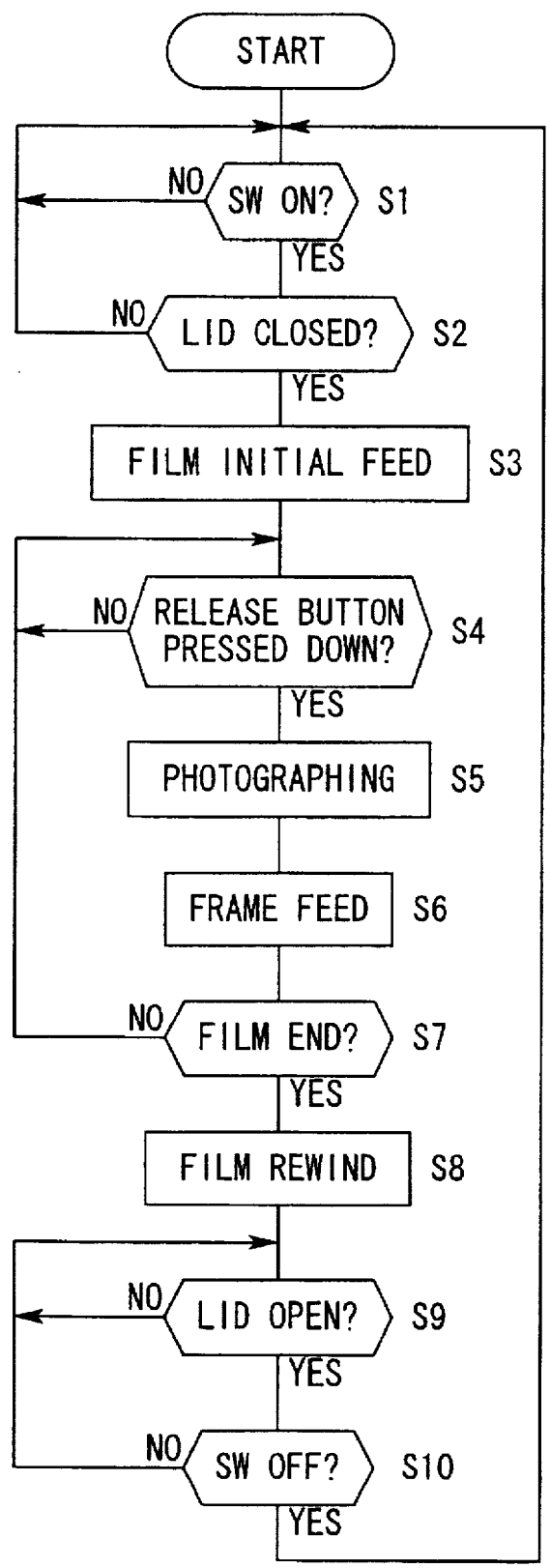
FIG. 8 is a flow chart illustrating the operation of the camera.

In reference to the flow chart in FIG. 8, an example of the use of the load detection switch SW described above is explained.

This program is activated when a source battery (not shown) is loaded in the camera main body 1. In step S1, through on/off operation of the load detection switch SW, a decision is made as to whether or not a cartridge is loaded. If the load detection switch SW is off, it is decided that no cartridge is loaded and the operation stays at step S1, whereas, if the load detection switch SW is on, it is decided that a cartridge is loaded and the operation proceeds to step S2. In step S2, with the on/off operation of the open/close lid switch SW2, a decision is made as to whether or not the open/close lid 3 is open or closed. If the open/close lid switch SW2 is on, it is decided that the open/close lid 3 is open and the operation returns to step S1, whereas, if the open/close lid switch SW2 is off, it is decided that the open/close lid 3 is closed and the operation proceeds to step S3.

In step S3, an initial feed of the film is performed by the feed device 1002. As a result, the film is wound up onto the take-up spool by the equivalent of 3–4 frames so that the first frame is made to face opposite the aperture. In step S4, with the on/off operation of the release switch SW1, a decision is made as to whether or not the release button has been pressed down. If the release switch SW1 is off, it is decided that the release button has not been pressed down and the operation remains at step S4, whereas if the release switch SW1 is on, it is decided that the release button has been pressed down and the operation proceeds to step S5.

In step S5, photographing is performed by driving the exposure control device 1004 and in step S6, the film is wound up by one frame by the feed device 1002. In step S7, a decision is made by the end-detection device 1003 as to whether or not the film has reached its trailing end and, if a negative decision is made, the operation returns to step S4, whereas if an affirmative decision is made, the operation proceeds to step S8. In step S8, the entire film is re-wound into the cartridge 4 by driving the feed device 1002.

In step S9, based upon the state of the open/close lid switch SW2, a decision is made as to the open/closed state of the open/close lid 3 in the same manner as described above, and if the lid is closed, the operation remains in step S9, whereas, if the lid is open, the operation proceeds to step S10. In step S10, a decision is made by the load detection switch SW as to whether or not a cartridge is loaded, and if one is loaded, the operation returns to step S9, whereas, if no cartridge is loaded, it returns to step S1.

Note that the force applying mechanism is not restricted to a torsion coil spring. In addition, although an example in which the switch operating member is integrated with the eject lever has been presented, the switch operating member may be constituted with a member independent of the eject lever. Furthermore, although, in the example, the push-out portion 85 of the eject lever 8 is separated from the cartridge 4 when the cartridge is loaded, they may be in contact, as long as the recovery force of the load detection switch SW does not work on the cartridge 4 via the eject lever 8. In addition, while the explanation has been given of a load detection switch which is of the type whereby the contact pieces 50a and 50b come in contact with each other when a cartridge is loaded, the load detection switch may be of the type whereby the contact pieces 50a and 50b are not in contact when the a cartridge is loaded. Moreover, the explanation as been made using a camera, however, the present invention may be employed in an device other than a camera, in which a film cartridge is loaded for purposes other than photographing. Furthermore, the present invention may be applied to the mechanism in which the film cartridge is loaded into the cartridge chamber in the direction perpendicular to the longitudinal direction.

I claim:

1. A film cartridge loading mechanism comprising:

a cartridge chamber into which a film cartridge is loaded;

an eject member capable of traveling between a housing position at which said loaded film cartridge is held inside said cartridge chamber, and a take-out position at which a portion of said film cartridge projects out of said cartridge chamber, that travels to said housing position as said film cartridge is loaded and travels to said take-out position by an eject operation;

a pressure applying member which presses said film cartridge in said cartridge chamber in a direction of a longitudinal axis of said film cartridge to regulate a movement of said film cartridge; and a toggling force applying mechanism that applies a force to said eject member, said toggling force applying mechanism changing a direction of force application thereto while said eject member moves, in such a manner that said eject member at said housing position is held at said housing position and said eject member at said take-out position is held at said take-out position, and wherein:

said eject member at said housing position does not transmit the force of said toggling force applying mechanism to said film cartridge loaded in said cartridge chamber.

2. A mechanism according to claim 1, wherein;

said pressure applying member is provided at a cartridge chamber lid that opens and closes said cartridge chamber, and presses said film cartridge in the direction of said longitudinal axis when said cartridge chamber lid is closed.

3. A mechanism according to claim 1, wherein;

said eject member at said housing position is not in contact with said film cartridge in said cartridge chamber.

4. A mechanism according to claim 1, further comprising;

a load detection switch which outputs a cartridge present signal with said eject member moving to said housing position and outputs a cartridge absent signal with said eject member moving from said housing position toward said take-out position.

5. A film cartridge loading mechanism comprising:

a cartridge chamber into which a film cartridge is loaded;

a pressure applying member which presses said film cartridge in said cartridge chamber in a direction of a longitudinal axis of said film cartridge to regulate a movement of said film cartridge;

a load detection switch provided with a contact piece that becomes deformed by being pressed in a same direction as the direction in which said cartridge is pressed by said pressure applying member and recovers to an original shape when the pressure is released, said load detection switch outputting a cartridge present signal with said contact piece being deformed and outputting a cartridge absent signal with said contact piece being recovered to the original shape;

a switch operating member that holds a position away from said contact piece when said film cartridge is absent from said cartridge chamber and travels to a pressure applying position at which said contact piece is pressed to become deformed with said film cartridge being loaded into said cartridge chamber; and a retaining mechanism which retains said switch operating member at said pressure applying position when said film cartridge is in said cartridge chamber without applying a recovering force of said contact piece which is deformed, to said cartridge loaded in said cartridge chamber.

6. A mechanism according to claim 5, wherein;

said retaining mechanism is a force applying mechanism that applies a force to said switch operating member toward said pressure applying position.

7. A mechanism according to claim 6, wherein;

said force applying mechanism is a toggling force applying mechanism that applies a force to said switch operating member, said toggling force applying mechanism changing a direction of force application thereto while said switch operating member moves, in such a manner that said switch operating member at said pressure applying position is held at said pressure applying position and said switch operating member at said position away from said contact piece is held at said position away from said contact piece.

8. A mechanism according to claim 5, wherein;

said pressure applying member is provided at a cartridge chamber lid which opens and closes said cartridge chamber and presses said film cartridge in the direction of said longitudinal axis when said cartridge chamber lid is closed.

9. A mechanism according to claim 5, wherein;

said switch operating member retained at said pressing position is not in contact with said film cartridge in said cartridge chamber.

10. A mechanism according to claim 5, further comprising;

an eject member capable of traveling between a housing position at which said loaded film cartridge is held inside said cartridge chamber, and a take-out position at which a portion of said film cartridge projects out of said cartridge chamber, that travels to said housing position as said film cartridge is loaded and travels to said take-out position with an eject operation, wherein;

said switch operating member constitutes a portion of said eject member.

11. A mechanism according to claim 10, wherein;

said eject member is provided with a push-out portion which pushes out said film cartridge from said cartridge chamber with said eject member traveling from said housing position to said take-out position, said push-out portion of said eject member functioning as said switch operating member.

12. A mechanism according to claim 10, wherein;

said retaining mechanism is a toggling force applying mechanism that applies a force to said eject member, said toggling force applying mechanism changing a direction of force application thereto while said eject member moves, in such a manner that said eject member at said housing position is held at said housing position and said eject member at said take-out position is held at said take-out position.

* * * * *